Patented Nov. 26, 1946

2,411,726

UNITED STATES PATENT OFFICE 2,411,726

PRODUCTION OF AROMATIC HYDROCARBONS

Ronald Holroyd and David Hallam Primrose Peel, Norton-on-Tees, England, assignors to Imperial Chemical Industries Limited, a corporation of Great Britain No Drawing. Application March 3, 1942, Serial No. 433,238. In Great Britain April 20, 1939

15 Claims. (Cl. 260—668)

This invention relates to the catalytic dehydrogenation of saturated cyclic hydrocarbons having at least one ring containing six carbon atoms (hereinafter referred to as hexamethylene naphthenes) or mixtures containing them for example, methyl cyclohexane and dimethyl cyclohexanes, to the corresponding aromatic hydrocarbons, for example, toluene and xylenes.

It is known to dehydrogenate pure hexamethylene naphthenes and mixtures thereof into the corresponding aromatic hydrocarbons by heating them in the presence of highly active catalysts, for example, rare metals. However, in carrying out this process it is found that the highly active catalysts rapidly deteriorate if the hexamethylene naphthenes are accompanied by paraffin hydrocarbons, and/or pentamethylene naphthenes (cyclopentane homologues), and/or unsaturated hydrocarbons, such as olefines, and/or sulphur and its compounds. The term "toxigen," as employed in the appended claims, is to be understood as signifying one of those substances just enumerated which cause rapid deterioration of such highly active catalysts in the stated dehydrogenation process.

We have now found that, in the dehydrogenation to the corresponding aromatic hydrocarbons of hexamethylene naphthenes in mixtures of the same containing paraffin hydrocarbons and/or pentamethylene naphthenes and/or unsaturated hydrocarbons and/or small amounts of sulphur or sulphur compounds by treatment of the mixtures at temperatures not exceeding 450° C. in the presence of highly active dehydrogenating catalysts, the rate of deterioration in activity of the said catalysts can be diminished and even reduced to zero by adding hydrogen at the commencement of the reaction zone. The hydrogen to be added may be obtained from external sources or may be that previously produced in the dehydrogenation itself, after separation from the other reaction products, for example by cooling.

According to the invention, therefore, in a process for the dehydrogenation to aromatic hydrocarbons of the corresponding hexamethylene naphthenes in a mixture containing also paraffin hydrocarbons and/or pentamethylene hydrocarbons and/or unsaturated hydrocarbons and/or sulphur or sulphur compounds, in the presence of a catalyst consisting of or comprising at least one of the metals of group VIII of the periodic system excepting iron, cobalt and nickel, supported on activated carbon, maintained at a temperature not exceeding 450° C. and preferably between 250° C. and 400° C., the life of the catalyst is lengthened by carrying out the reaction in the presence of added hydrogen.

With any given catalyst, reaction material, throughput and reaction temperature, as the amount of added hydrogen is increased the rate of catalyst deterioration decreases and finally reaches zero. With further increase in the amount of hydrogen added the rate of deterioration of catalyst activity remains zero, but eventually a concentration of hydrogen, depending on the other conditions of operation, is reached at which hydrogenation predominates over dehydrogenation. It will be understood that such amounts of hydrogen which cause hydrogenation to predominate over dehydrogenation should not be added.

Generally it will be found desirable to add an amount of hydrogen which prevents any loss of activity of the catalyst during a period of at least 100 hours.

The amount of hydrogen required to achieve any given diminution in the rate of deterioration of catalyst activity can be readily gauged by small scale trials. It depends on the reaction material and the reaction conditions, and increases with the temperature, with the concentration of paraffins, pentamethylene naphthenes, unsaturated hydrocarbons, sulphur and its compounds in the reaction material, and with the working pressure.

It is desirable that sulphur and its compounds should be as low in concentration as possible in the reaction vessel since these have been found to have a very unfavourable effect on the reaction. Unsaturated hydrocarbons should also be present in as low a concentration as possible. In addition, carbon monoxide, and any substances capable of giving rise to the same under the reaction conditions, for example carbon dioxide, oxygen or steam, as well as ammonia, and other nitrogen compounds, should be kept low in concentration or removed entirely from the hydrogen fed to the reaction since these also have been found to have an unfavourable effect on the reaction. If desired, the reaction material to be dehydrogenated and/or the hydrogen to be added may be subjected to a preliminary treatment to remove constituents harmful to the catalyst, or to reduce their concentration.

The preliminary treatment of the reaction material to remove sulphur may consist in subjecting the crude mixture in the vapor phase to treatment with hydrogen in the presence of a mild hydrogenating catalyst whereby sulphur compounds are converted into hydrogen sulphide which is then removed from the hydrocarbons in any convenient manner. Such a preliminary hydrogenation treatment also serves to decrease the amount of unsaturated hydrocarbons in the mixture which have been found to have a detrimental effect on the life of the catalyst. It is preferred to employ for this preliminary treatment a hydrogenating catalyst which is also capable of absorbing the hydrogen sulphide so that the vapours from the preliminary hydrogenation stage can be passed to the dehydrogenation stage without condensation which would otherwise be necessary in order to separate the hydrogen sulphide from the hydrocarbons.

The highly active dehydrogenating catalysts employed according to the invention may be prepared in any known manner, for example in the case of platinum supported on activated carbon, the latter may be impregnated with a solution of chloroplatinic acid, dried and reduced in a stream of hydrogen, preferably in the reaction vessel itself.

The dehydrogenation is preferably carried out at atmospheric pressure, but pressures higher than atmospheric may be used if desired. The hydrogen pressure, however, must obviously not be so great as to cause hydrogenation to predominate over dehydrogenation.

The present invention is particularly valuable for improving the anti-knock quality of petrols containing hexamethylene naphthenes. It is possible to treat the whole of a petrol by the process of the present invention with this end in view, but it is preferable to separate it first into two or more fractions, one or more of which is richer in hexamethylene naphthenes than the original petrol, and then to treat the fraction or fractions richer in hexamethylene naphthenes by the method of the present invention. The products of dehydrogenation may then be added wholly or in part to the whole or part of the untreated fraction or fractions. The petrol may be separated into two fractions, the cut being made at a temperature between 80° C. and 120° C., for example 95° C. The higher boiling fraction thereby contains a larger proportion of hexamethylene naphthenes and at the same time a relatively smaller proportion of paraffin hydrocarbons than the original petrol. By subjecting only the higher boiling fraction to dehydrogenation the advantages as compared with treating the whole petrol are that the quantity of reaction material treated in the dehydrogenation plant is smaller, more satisfactory operation of the catalyst is obtained because of the smaller amount of paraffin hydrocarbons and that there is less loss of low boiling constituents by entrainment in the gas stream.

Separation of the petrol into more than two fractions is of advantage where it is desired to dehydrogenate the various hexamethylene naphthenes under different conditions, or to adjust the characteristics of the final petrol, or to obtain particular fractions of aromatic hydrocarbons.

It is possible by the present invention to dehydrogenate substantially the whole of the hexamethylene naphthenes in the reaction material, but obviously, where required, it is possible, by suitable selection of operating conditions to dehydrogenate any desired proportion of the hexamethylene naphthenes in the reaction material.

The dehydrogenation may be carried out in one or more stages, with or without recycling a proportion of the products.

Example 1

A petrol from the hydrogenation of a middle oil contained by weight 5.9% aromatics, 42.5% paraffin hydrocarbons, 35.5% pentamethylene naphthenes, and 16.1% of hexamethylene naphthenes. This petrol was distilled to give 44% by weight of a fraction boiling up to 95° C. and 56% of a heavier fraction boiling above 95° C. The separation into two fractions concentrated 90% of the hexamethylene naphthenes present in the total petrol into the heavier fraction, while this fraction only contained 25% of the paraffin hydrocarbons present in the total petrol. The heavier fraction boiling above 95° C. contained 8% aromatic hydrocarbons, 19% paraffin hydrocarbons, 47% pentamethylene naphthenes and 26% of hexamethylene naphthenes.

The heavier fraction was then subjected to a preliminary treatment for the removal of sulphur compounds by passage with hydrogen, in the vapour phase and at atmospheric pressure, over a mildly hydrogenating catalyst consisting of a mixture of zinc oxide and nickel made by reduction in hydrogen at 400° C. of a mixture of 1 part of zinc carbonate to 24 parts of nickel carbonate. The treatment was carried out at a temperature of about 290° C. with a feed rate of 0.5 kilogram/litre of catalyst/hour and a hydrogen concentration of 150 cubic metres of pure hydrogen/ton of material treated. The hydrogen sulphide produced by the reaction was absorbed by the catalyst, which had to be removed from time to time.

The dehydrogenation treatment was carried out over a catalyst consisting of 5% of platinum supported on steam-activated cocoanut-shell charcoal. It was made by impregnation of the charcoal with a solution of chloroplatinic acid, with subsequent reduction, after drying, at 350° C. in a stream of pure hydrogen in the reaction vessel itself.

The vapours of the heavier petrol fraction, after pretreatment as described above, were then passed over the above dehydrogenation catalyst at atmospheric pressure and at a rate of 2.5 kilograms/litre of catalyst/hour, together with 640 cubic metres of pure hydrogen/ton of reaction material. At a temperature ranging from 280° C. to 320° C. through the catalyst, the whole of the 26% of hexamethylene naphthenes present in this petrol fraction were dehydrogenated to the corresponding aromatic hydrocarbons. The vapours were then condensed, giving a dehydrogenated product which contained 34% aromatic hydrocarbons, 19% paraffin hydrocarbons and 47% of pentamethylene hydrocarbons.

The dehydrogenated product was then mixed with the untreated fraction boiling below 95° C., thereby giving a petrol which then contained 22% of aromatic hydrocarbons as against the original 5.9%, while the octane number was then 80 as against an original 75.

Dehydrogenation of the hexamethylene naphthenes to the corresponding aromatic hydrocarbons is substantially the only reaction. Formation of unsaturated hydrocarbons by dehydrogenation of the paraffins or pentamethylene naphthenes was less than ½% of the reaction material, while less than 1% of the reaction material was broken down to hydrocarbon gases.

With the above amount of pure hydrogen added to the reaction material very satisfactory operation was obtained and the catalyst did not deteriorate over a period of 500 hours, dehydrogenation of the whole of the hexamethylene naphthenes present in the reaction material being attained without any further adjustment of the reaction conditions.

Example 2

Another petrol fraction containing 45% of hexamethylene naphthenes, which on testing with mercury gave an indication of the presence of sulphur, after a mild hydrogenation treatment as described in Example 1 was passed over the dehydrogenation catalyst of Example 1 under the conditions described therein, but with 380 cubic metres of pure hydrogen added per ton reaction material. A 100% conversion of the hexamethylene naphthenes was obtained over a period of 100 hours. Dehydrogenation treatment of the original petrol fraction without the preliminary hydrogenation treatment to remove sulphur compounds gave only 80% conversion of the hexamethylene naphthenes present.

The following data illustrate the effects of variations in the amount of added hydrogen and in the amount of sulphur compounds present.

(1) *Effect of varying the amount of added hydrogen*

With the same reaction material described in Example 1, and the same catalyst and reaction conditions, no deterioration of the catalyst was apparent over a period of 100 hours when 380 cubic metres of pure hydrogen were added per ton of reaction material instead of 640 cubic metres per ton. However, with 160 cubic metres per ton, the conversion of hexamethylene naphthenes to aromatic hydrocarbons fell from 100% to 97% in 15 hours. With only 64 cubic metres per ton the conversion fell to 79% in 27 hours, while with 32 cubic metres per ton the conversion fell to 64% in 18 hours. With no added hydrogen the conversion fell very rapidly to 48% in 12 hours. In all cases where the catalyst is deteriorating due to insufficient hydrogen there is some formation of unsaturated hydrocarbons which contribute to the deterioration of the catalyst.

(2) *Effect of different amounts of sulphur compounds*

A petrol fraction boiling above 95° C. and containing 30% of hexamethylene naphthenes, after it had been subjected to the preliminary mild hydrogenation process for sulphur removal described in the above example, was subjected to the dehydrogenation. Complete conversion of the hexamethylene naphthenes to aromatic hydrocarbons was maintained under the reaction conditions described in Example 1 for a period of 200 hours, with the addition of 640 cubic metres of pure hydrogen/ton of reaction material. Addition of 0.0035% by weight of sulphur to the reaction material, either as propyl sulphide or as thiopene, reduced the conversion from 100% to 11% in a period of 30 hours. In another case, the addition of 0.0007% by weight of sulphur as propyl sulphide reduced the conversion from 100% to 74% in 40 hours, while addition of 0.0087% of sulphur reduced the conversion to 5% in the same period. In each case 640 cubic metres of pure hydrogen per ton were added and in each case the activity of the catalyst reached a constant level and did not fall further. This level of activity is dependent on the proportion of hydrogen added, the higher this proportion the lower is the poisoning effect of a given amount of sulphur.

We claim:

1. A process for the dehydrogenation to aromatic hydrocarbons of the corresponding hexamethylene naphthenes contained in a mixture containing also at least one toxigen, which comprises separating from the mixture a relatively heavy fraction richer in hexamethylene naphthenes than said mixture and having an initial boiling point between 80° C. and 120° C. and subjecting said fraction together with added hydrogen at a temperature not exceeding 450° C. to the action of a catalyst containing at least one of the metals of group VIII of the periodic system except iron, cobalt and nickel, supported on activated carbon, the proportion of hydrogen added being sufficient to prevent substantial loss of activity of the catalyst during a prolonged operating period, but not sufficient to cause hydrogenation to predominate over dehydrogenation.

2. A process for the dehydrogenation to aromatic hydrocarbons of the corresponding hexamethylene naphthenes contained in a mixture containing also a deleterious sulphur compound which comprises largely removing said compound from the mixture and subjecting the residual mixture together with added hydrogen at a temperature not exceeding 450° C. to the action of a catalyst containing at least one of the metals of group VIII of the periodic system except iron, cobalt and nickel, supported on activated carbon, the proportion of hydrogen added being sufficient to prevent substantial loss of activity of the catalyst during a prolonged operating period, but not sufficient to cause hydrogenation to predominate over dehydrogenation.

3. A process for the dehydrogenation to aromatic hydrocarbons of the corresponding hexamethylene naphthenes contained in a mixture containing also a deleterious sulphur compound which comprises subjecting the said mixture in the vapour phase to treatment with hydrogen in the presence of a mild hydrogenating catalyst so as largely to convert the sulphur of said compound into hydrogen sulphide, separating the hydrogen sulphide from the mixture and subjecting the residual mixture together with added hydrogen at a concentration of between 200 and 640 cubic meters per ton of mixture treated, and at a temperature not exceeding 450° C., to the action of a catalyst containing at least one of the metals of group VIII of the periodic system except iron, cobalt and nickel, supported on activated carbon.

4. A process for the dehydrogenation to aromatic hydrocarbons of the corresponding hexamethylene naphthenes contained in a mixture containing also at least one toxigen which comprises separating from the mixture a relatively heavy fraction richer in hexamethylene naphthenes than said mixture and having an initial boiling point between 80° C. and 120° C. and subjecting said fraction together with added hydrogen at a temperature between 250° C. and 400° C. to the action of a catalyst containing at least one of the metals of group VIII of the periodic system except iron, cobalt and nickel, supported on activated carbon, the proportion of hydrogen added being sufficient to prevent substantial loss of activity of the catalyst during a prolonged operating period, but not sufficient to cause hydrogenation to predominate over dehydrogenation.

5. A process for the dehydrogenation to aromatic hydrocarbons of the corresponding hexamethylene naphthenes contained in a mixture containing also at least one toxigen, which comprises separating from the mixture a relatively heavy fraction richer in hexamethylene naphthenes than said mixture and having an initial boiling point between 80° C. and 120° C. and subjecting said fraction together with added hydrogen in an amount of at least 200 cubic metres per metric ton of the fraction and at a temperature not exceeding 450° C. to the action of a catalyst containing at least one of the metals of group VIII of the periodic system except iron, cobalt and nickel, supported on activated carbon, the proportion of hydrogen added being sufficient to prevent substantial loss of activity of the catalyst during a prolonged operating period, but not sufficient to cause hydrogenation to predominate over dehydrogenation.

6. A process for the dehydrogenation to aromatic hydrocarbons of the corresponding hexamethylene naphthenes contained in a mixture containing also at least one toxigen, which comprises separating from the mixture a relatively heavy fraction richer in hexamethylene naphthenes than said mixture and having an initial boiling point between 80° C. and 120° C. and subjecting said fraction together with added hydrogen at a temperature not exceeding 450° C. to the action of a catalyst containing platinum supported on activated carbon, the proportion of hydrogen added being sufficient to prevent substantial loss of activity of the catalyst during a prolonged operating period, but not sufficient to cause hydrogenation to predominate over dehydrogenation.

7. A process for the dehydrogenation to aromatic hydrocarbons of the corresponding hexamethylene naphthenes contained in a mixture containing also a deleterious sulphur compound which comprises subjecting the said mixture in the vapour phase to treatment with hydrogen in the presence of a mild hydrogenating catalyst so as largely to convert the sulphur of said compound into hydrogen sulphide, separating the hydrogen sulphide from the mixture and subjecting the residual mixture together with added hydrogen at a temperature not exceeding 450° C. to the action of a catalyst containing platinum supporting on activated carbon, the proportion of hydrogen added being sufficient to prevent substantial loss of activity of the catalyst during a prolonged operating period, but not sufficient to cause hydrogenation to predominate over dehydrogenation.

8. A process for the dehydrogenation to aromatic hydrocarbons of the corresponding hexamethylene naphthenes contained in a mixture containing also at least one toxigen, which comprises subjecting the mixture in vapor phase, together with added hydrogen, at a temperature not exceeding 450° C., to the action of a catalyst containing at least one of the metals of group VIII of the periodic system except iron, cobalt and nickel, supported on activated carbon, the proportion of hydrogen added being sufficient to prevent substantial loss of activity of the catalyst during a prolonged operating period, but not sufficient to cause hydrogenation to predominate over dehydrogenation.

9. A process for the dehydrogenation to aromatic hydrocarbons of the corresponding hexamethylene naphthenes contained in a mixture containing also at least one toxigen, which comprises subjecting the mixture in vapor phase, together with added hydrogen, at a temperature not exceeding 450° C., to the action of a catalyst containing at least one of the metals of group VIII of the periodic system except iron, cobalt and nickel, supported on activated carbon, the proportion of hydrogen added being sufficient to prevent substantial loss of activity of the catalyst during an operating period of at least one hundred hours, but not sufficient to cause hydrogenation to predominate over dehydrogenation.

10. The process defined in claim 8 wherein the hydrogen is added in the proportion of at least 200 cubic meters per ton of reaction material.

11. The process defined in claim 8 wherein the operating temperature is maintained between 250° C. and 400° C.

12. The process defined in claim 9 wherein the operating temperature is maintained between 250° C. and 400° C.

13. A process for the dehydrogenation to aromatic hydrocarbons of the corresponding hexamethylene naphthenes contained in a mixture containing also at least one toxigen, which comprises subjecting the mixture in vapor phase, together with added hydrogen, at a temperature not exceeding 450° C., to the action of a catalyst containing platinum supported on activated carbon, the proportion of hydrogen added being sufficient to prevent substantial loss of activity of the catalyst during an operating period of at least one hundred hours, but not sufficient to cause hydrogenation to predominate over dehydrogenation.

14. The process defined in claim 13, wherein the hydrogen is added in the proportion of at least 200 cubic meters per ton of reaction material.

15. The process defined in claim 13, wherein the operating temperature is maintained between 250° C. and 400° C.

RONALD HOLROYD.
DAVID HALLAM PRIMROSE PEEL.